US 9,014,405 B2

(12) United States Patent
Larsen et al.

(10) Patent No.: US 9,014,405 B2
(45) Date of Patent: Apr. 21, 2015

(54) STORAGE SYSTEM FOR A HEARING AID

(75) Inventors: Soren Mollskov Larsen, Varlose (DK); Mike Lind Rank, Farum (DK); Mette Dahl Meincke, Varlose (DK)

(73) Assignee: Widex A/S, Lynge (DK)

(*) Notice: Subject to any disclaimer, the term of this patent is extended or adjusted under 35 U.S.C. 154(b) by 0 days.

(21) Appl. No.: 13/368,807

(22) Filed: Feb. 8, 2012

(65) Prior Publication Data

US 2012/0140963 A1   Jun. 7, 2012

Related U.S. Application Data

(63) Continuation-in-part of application No. PCT/DK2009/050199, filed on Aug. 11, 2009.

(51) Int. Cl.
  *H04R 25/00* (2006.01)
  *H02J 7/00* (2006.01)
  *H02J 7/02* (2006.01)

(52) U.S. Cl.
  CPC .............. *H04R 25/70* (2013.01); *H02J 7/0044* (2013.01); *H02J 7/025* (2013.01); *H04R 25/30* (2013.01); *H04R 25/55* (2013.01); *H04R 2225/31* (2013.01); *H04R 2225/61* (2013.01); *H04R 2460/17* (2013.01); *H04R 25/407* (2013.01); *H04R 25/43* (2013.01)

(58) Field of Classification Search
  USPC ........... 381/60, 312, 315, 316, 320–324, 328; 73/585; 600/559
  See application file for complete search history.

(56) References Cited

U.S. PATENT DOCUMENTS

| 4,379,988 | A | 4/1983 | Mattatall |
| 5,710,819 | A | 1/1998 | Topholm et al. |
| 7,003,128 | B2 * | 2/2006 | Boonen .................... 381/322 |
| 7,269,262 | B2 * | 9/2007 | Iseberg et al. ............ 381/60 |
| 7,856,107 | B2 * | 12/2010 | Siltmann .................. 381/60 |
| 2002/0126864 | A1 | 9/2002 | Dennis, III et al. |
| 2003/0165250 | A1 | 9/2003 | Garber et al. |
| 2007/0195979 | A1 | 8/2007 | Thomasson et al. |
| 2007/0286429 | A1 | 12/2007 | Grafenberg et al. |

FOREIGN PATENT DOCUMENTS

| CN | 1524398 A | 8/2004 |
| JP | 8-510602 A | 11/1996 |

OTHER PUBLICATIONS

International Search Report for PCTDK2009050199 dated Feb. 12, 2010.
Japanese Office Action for Japanese Patent Application No. 2012-524115 dated Sep. 3, 2013 with English translation.
Chinese Office Action for corresponding Application No. 200980160841.6 dated Nov. 27, 2013 with English Translation.

* cited by examiner

*Primary Examiner* — Curtis Kuntz
*Assistant Examiner* — Joshua A Kaufman
(74) *Attorney, Agent, or Firm* — Sughrue Mion, PLLC

(57) ABSTRACT

A storage system for storing a hearing aid comprises means for providing power (101), a storage space (102) for containing a hearing aid, output means, communication means through which data from the hearing aid is received wirelessly and a processing unit for processing data received from the hearing aid. The output means is capable of providing functioning and guiding information (104) concerning the functioning of the hearing aid and for guiding the user through positioning of the hearing aid, respectively. The invention further provides a hearing aid, a kit and a method of testing a hearing aid.

16 Claims, 4 Drawing Sheets

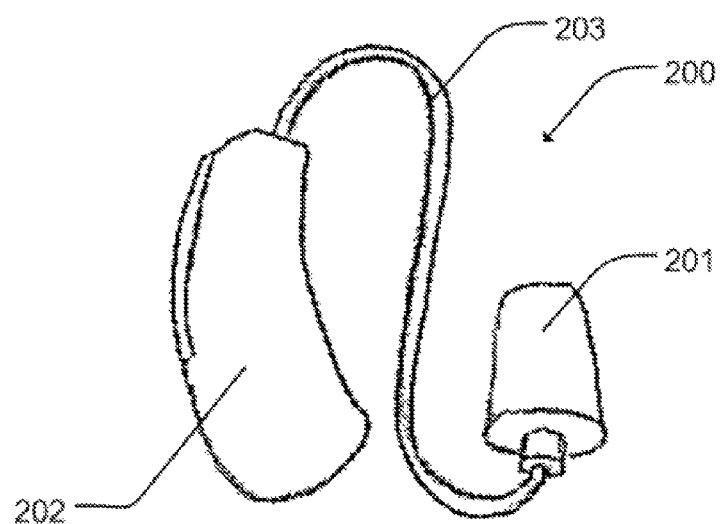
Fig. 2
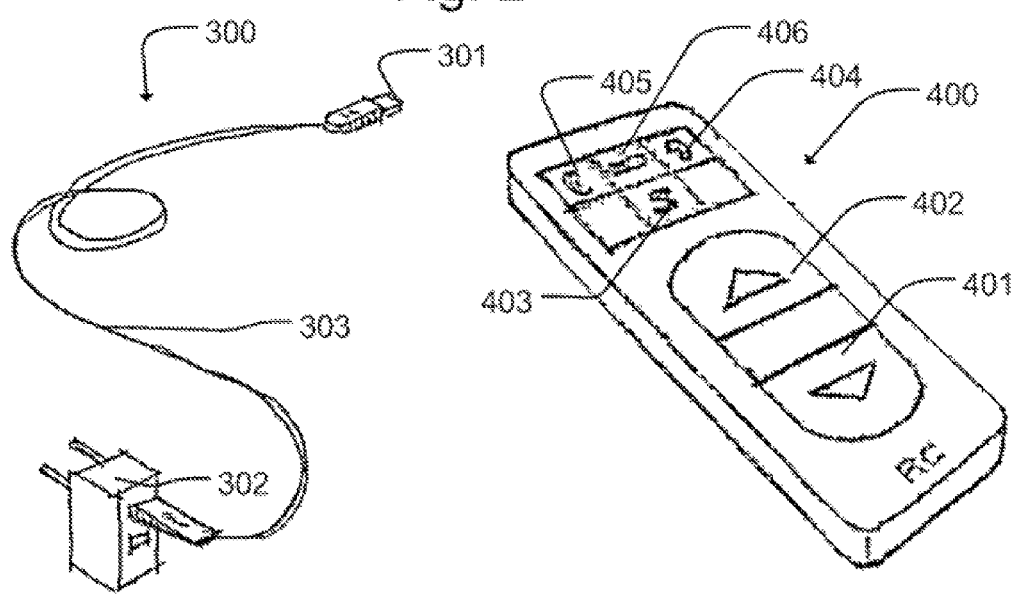
Fig. 3
Fig. 4

STORAGE SYSTEM FOR A HEARING AID

RELATED APPLICATIONS

The present application is a continuation-in-part of application PCT/DK 2009050199, filed on Aug. 11, 2009, in Denmark and published as WO2011018086 A1.

BACKGROUND OF THE INVENTION

1. Field of the Invention

The present invention relates to hearing aids and accessories for hearing aids. The invention more specifically relates to a storage system for storing a hearing aid, the storage system comprises: means for providing power, a storage space for containing a hearing aid, output means, communication means through which data from the hearing aid is received wirelessly, and a processing unit for processing data received from the hearing aid. The invention also relates to a hearing aid adapted for communicating with such a storage system, a kit and a method of performing a test.

2. The Prior Art

Hearing aids have been used for many years, and as the development progresses, the hearing aids have gotten smaller, and contain a lot more technical features then they used to. Some of the different hearing aids available today include Behind-The-Ear (BTE) devices, Receiver-In-The-Ear/Canal (RITE/RIC), In-the-Canal (ITC) and Completely-In-the-Canal (CIC) devices.

Many people find themselves suddenly in a need of a hearing aid and are confronted with a small high tech product they have to handle on a daily basis. For some users, such as elderly, physically or mentally challenged or children, this can be a difficult task that requires some form of help. This could be from caretakers and/or a device that can help them with the hearing aid's function and the positioning of the hearing aid, in particular the earplug part thereof, in the ear.

The user may not be able to express what is wrong with the hearing aid or express if anything in the hearing aid is malfunctioning at all, in particular if the user is a child or a mentally challenged person. In some cases the user may be able to express what is wrong with the hearing aid, but not able to take care of the problem himself, e.g. if the person is physically challenged, and needs another person to take care of the problem. The caretaker on the other hand, may be an employee at a nursing home, who has to deal with many different hearing aids and other aids during their day, and doesn't have time to read all the different kinds of manuals that come with the aids. Instead they need an instant solution with an intuitive user interface.

SUMMARY OF THE INVENTION

Based on this background, a feature of the present invention is to provide a simple to use tool for guiding users of hearing aids or their caretakers in all aspects of hearing aid handling, including the functioning and the positioning of the hearing aid.

In view of this a storage system capable of providing functioning and guiding information concerning the functioning of the hearing aid and for guiding the user through positioning of the hearing aid, respectively, has been developed.

The invention, in a first aspect, provides a storage system for storing a hearing aid, the system comprising means for providing power, a storage space for containing a hearing aid, output means, communication means adapted for wireless reception of data from the hearing aid, a processing unit for processing data received from the hearing aid, wherein the output means is adapted for providing information concerning the functioning of the hearing aid and for guiding the user through positioning of the hearing aid in the ear, respectively. The guiding information allows for easy positioning of the hearing aid at the ear. This is in particular useful if the user is physically or mentally challenged and not able to position the hearing aid by himself or able to provide feedback whether the hearing aid is positioned correctly or not. The functioning information may comprise information for each of right and left hearing aid comprising battery status, connection status for TV/telecoil, self test diagnostics, wax filter status etc.

In another embodiment, the storage system further comprises a remote control. By having a remote control it is possible to communicate with the system or the hearing aid without being in the vicinity of the system.

In another embodiment, the storage system may comprise user input means for receiving user input. This is easier for either a user or a caretaker as the buttons on a hearing aid may be small and hard to reach.

In another embodiment, the user input means is selected from a group consisting of a remote control, a touch screen and keys. These are input means that are easy to relate to for the user or caretaker, and they are easier to see and may provide more information than buttons on a hearing aid.

In another embodiment, the functioning and guiding information is presented in a form selected from a group consisting of written statements and figures, pictograms, light emitting diodes (LED's), sound and a bar code. This makes the information user friendly, even for persons not familiar with the hearing aid and its functions or for physically or mentally challenged.

In another embodiment, the output means is selected from a group consisting of a display, a light emitting diode and a loud speaker. The output means makes it easy for the user or a caretaker to see or hear what needs to be corrected or adjusted.

In another embodiment, the output means is provided on the remote control. This makes the output more accessible to the user, as the user does not need to be near the system to get the information provided through the output means.

In another embodiment, the processing means is provided in the remote control. This way the data can be processed directly in the remote control. So if the user is out somewhere, he can receive guiding and functioning information without bringing the system with him.

In another embodiment, the storage system comprises charging means for charging a rechargeable battery of the hearing aid. This makes it possible to charge the battery at times when the hearing aid is not in use anyway. Moreover there is no need to change the battery in the hearing aid.

In another embodiment, the charging means is adapted to charge the rechargeable battery of the hearing aid wirelessly. This will increase user friendliness, as no part has to fit specifically to another part, which would have been the case if the device had to be plugged in. Furthermore it is easier to keep clean.

In another embodiment, the storage system comprises a detector adapted to detect if the hearing aid is in the storage space. In this way, the storage system can either start a test of the hearing aid immediately or start charging the battery as soon as the hearing aid is in place in the storage space, which may also function as a charging space. Thus, no further user interaction is required. This eases the use and handling of the hearing aid.

In a preferred embodiment, the storage system further comprises testing means for testing functionality of the hearing aid. The testing means makes it possible for the user to find out if something in the hearing aid is malfunctioning.

In another embodiment, the storage system further comprises a storage unit provided with a lid. The lid may comprise output means. The lid may serve as a closure for the storage unit, which may be in the shape of a box. In this way the different elements in the storage unit don't get dusty and it gets easier to transport the hearing aids. The output means may serve as an information providing module displaying guiding and functioning information to help the user and the caretaker with handling of the hearing aid.

In another embodiment, the storage system comprises remote control securing means for keeping the remote control attached to the storage system. In this way the remote control doesn't bump into the hearing aid during transport, which might break the hearing aid. Moreover the securing means also prevents mentally challenged people or children from removing the remote control.

According to the invention, in a second aspect, a hearing aid is adapted to communicate wirelessly with communication means of a storage system. In this way there is no need to provide specific plugs and sockets for facilitating communication. Furthermore the storage system can communicate with the hearing aid, while it is positioned at the ear of a user.

In another embodiment, the hearing aid comprises a rechargeable battery. This eliminates the need for changing a small battery, which may be difficult to handle for the user or manage for the caretaker, at least on a daily basis.

In another preferred embodiment the hearing aid comprises: detecting means for detecting the position of an ear plug part of the hearing aid in the ear, and communication means for communicating data from the detecting means to the storage system.

In another embodiment, the hearing aid is automatically turned off when placed in the storage system, and automatically turned on when removed from the storage system. This makes it easier for the user, as the user doesn't have to worry about turning the hearing aid on and off.

In another embodiment, the hearing aid further comprises testing means for testing functionality of the hearing aid. The testing means makes it possible for the user to find out if something in the hearing aid is malfunctioning.

The invention, in a third aspect, provides a kit comprising a hearing aid, a remote control, a storage unit, and output means, wherein the hearing aid is adapted to communicate wirelessly with communication means of the storage unit, and wherein the output means is adapted for providing information concerning the functioning of the hearing aid and for guiding the user through positioning of the hearing aid in the ear. By providing the user with a kit, all the elements needed to perform the different tests are found in one place. The kit may further comprise one or more of the following: devices for holding, inserting or removing a hearing aid, cleaning agents, brushes and cloths for cleaning of the hearing aid, a user manual or an instruction guide which may be a laminated sheet of paper, and a power supply for charging the storage unit.

According to the invention, in a fourth aspect a method of using a storage system, comprises initiating a detection by the hearing aid of a position of the earplug part of the hearing aid in an ear, receiving in the processing unit result values from the detection from said hearing aid, comparing result values with reference values, and providing feedback information for guiding the user regarding the position. By providing feedback regarding the position, it is possible to correct the position of the ear plug part of the hearing aid, so the user does not have to wear a hearing aid that doesn't provide the adequate hearing support.

Any feature of the first aspect may be applied to the second, the third or the fourth aspects. Any feature of the second aspect may be applied to the third or the fourth aspects. Any feature of the third aspect may be applied to the fourth aspect. Other objectives, features and advantages of the present invention will appear from the following detailed disclosure, from the attached dependent claims as well as from the drawings.

Use of the word hearing aid, microphone or loudspeaker in singular is to be interpreted as at least one instance of a hearing aid, microphone or loudspeaker, respectively. Any reference to a device, element, means or part in singular or in plural may also be interpreted as at least one instance of a device, element, means or part, respectively.

Regarding use of the words storage system and storage unit; the storage unit is a part of the storage system, as will be described in the detailed part of the specification, while the storage system may comprise more features or accessories than the storage unit. When speaking of the positioning of the hearing aid or the earplug part, the skilled person will realize that what is meant is primarily the position of the earplug of the hearing aid part in the ear. Moreover, he will realize that if the hearing aid is an ITC or a CIC hearing aid, the whole hearing aid may effectively constitute the ear plug part. If it is a RITE hearing aid, only a part of the hearing aid is actually in the ear. Using "hearing aid" or "ear plug part" does not mean that any type of hearing aid is excluded.

BRIEF DESCRIPTION OF THE DRAWINGS

The invention will now be explained in more detail below by means of examples of embodiments with reference to the drawings, in which

FIG. 2 illustrates an embodiment of a hearing aid.

FIG. 3 illustrates an embodiment of a power supply.

FIG. 4 illustrates an embodiment of a remote control.

DETAILED DESCRIPTION OF THE INVENTION

Figure 1:
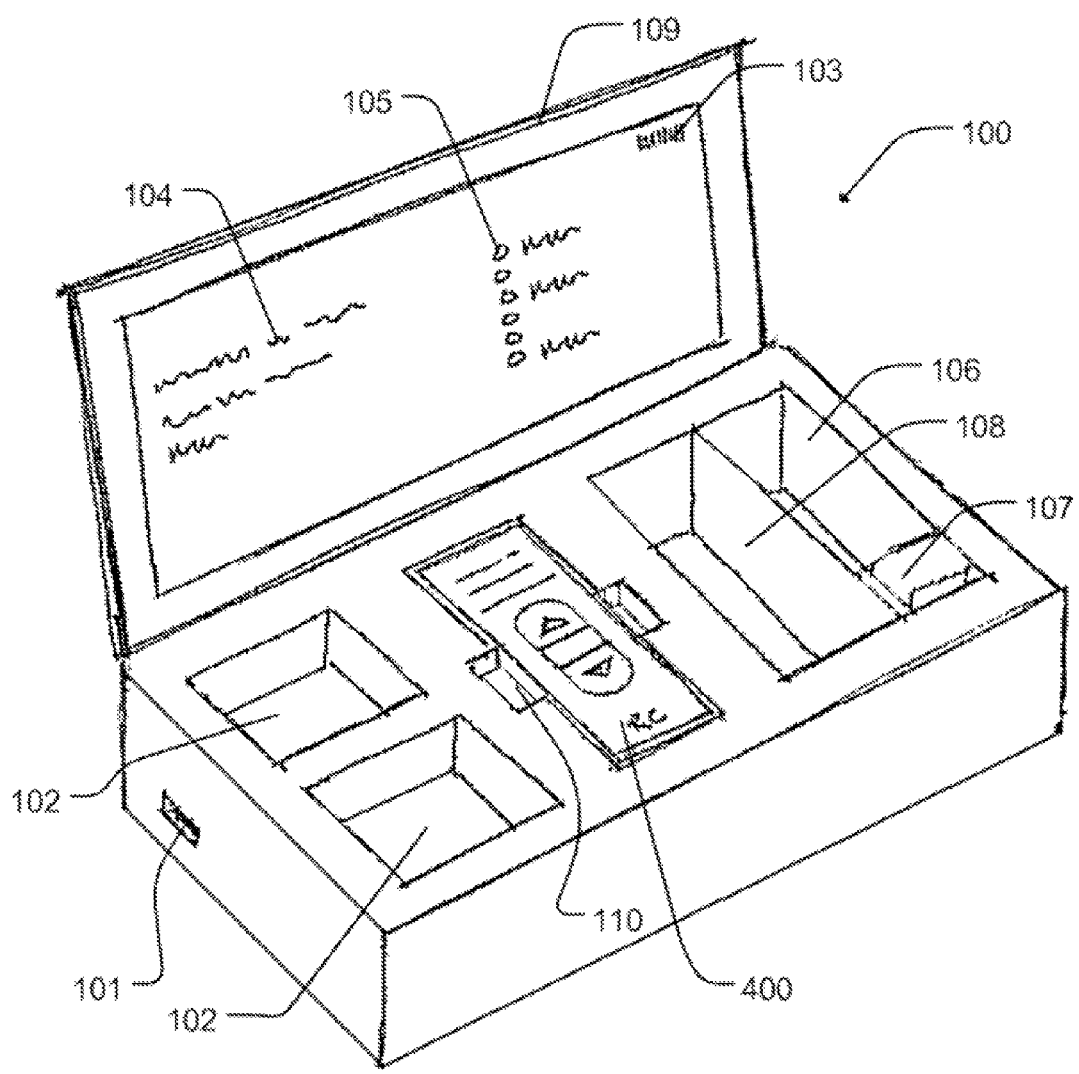
FIG. 1 illustrates an embodiment of a storage unit and a remote control of the system according to the invention.

FIG. 1 shows a storage unit 100. The storage unit 100 is used for storing hearing aids as well as for providing guiding and functioning information concerning the positioning of the hearing aid in the ear. The storage unit 100 comprises two storage spaces 102 for storing the hearing aids. The storage space 102 may have different shapes or forms depending on the type of hearing aid and the functionality of the storage unit 100. Depending on the type of hearing aid, the storage space 102 is e.g. a plane surface or a depression shaped like a sphere or like a box. A plane surface would be useful if transport is not necessary, e.g. the storage unit 100 could be a flat tray or plate, where the storage space is marked or designated areas for placing the hearing aids. The design of such a plate or tray might appeal aesthetically more to some people than a closed box would.

These shapes are preferred when the hearing aid is e.g. a BTE, RITE or an RIC hearing aid, as it might be difficult to place a connector (as shown in FIG. 2) in a molded form. For other types of hearing aids, such as ITC or CIC, a storage space 102 molded in the form of the hearing aid is preferred because the hearing aids are smaller and are better secured this way.

When it comes to functionality, i.e. testing of the hearing aid and possibly charging, it is easier to place the hearing aid correctly so the microphone, speaker and radio module of the hearing aid is positioned correctly in relation the testing means in the storage unit 100, when the storage space 102 is molded, or an outline of the hearing aid is drawn at the bottom of the storage space, thus indicating the best position of the hearing aid. The testing means will be described in further detail in association with FIG. 7.

The storage space 102 preferably also serves as a charging space. Thus the shape of the storage space 102 may affect how easy it is to transfer power from the storage unit 100 to the hearing aid, if the charging is done wirelessly. The battery of the hearing aid is left in the hearing aid while placed in the storage space 102. When the hearing aid is placed in the storage space 102 it starts to charge automatically. This is done without further input from the user. When the hearing aid is removed from the storage space 102, the hearing aid stops the charging. Similarly the hearing aid will be turned off automatically when placed in the storage space 102, and turned on when removed from the storage space 102.

The storage unit is furthermore provided with a lid 109, which may comprise information 104 for the user or the caretaker. This information is displayed as printed text or a screen displaying varying text such as guiding and functioning information, e.g. battery status, wax filter status, care instructions or information as to whether or not the hearing aid is positioned correctly. The information 104 is written permanently on a surface of the lid 109, possibly assisted by light emitting diodes to indicate which information 104 is currently relevant for the user. The information 104 depends e.g. on tests performed on the hearing aid relating to the functioning and the positioning of the hearing aid. Light emitting diodes 105 may also be used in front of a piece of text in the lid 109, providing user guidance in form of information 104, thus indicating the correct instruction to the user. If an error is detected, the light emitting diode 105 may emit a light. To indicate an error the light may be red. If the user runs a test and it is passed or if the hearing aid is positioned correctly at the ear, a light emitter may emit a green light. Other kinds of light emitters may also be used. A display, a monitor, a screen, a laminated sheet or any other means for displaying information may also be used instead of simple light emitters.

Instead of using visual means, the guiding information and functioning information may also be provided as sound directly through the hearing aid and into to the ear of the user, or as sound transmitted through the storage unit 100.

The storage unit further comprises a USB socket 101 allowing feeding power from a power supply to the storage unit 100. The power socket may be a USB socket 101, a mini USB socket or any other socket through which the storage unit can receive power. The power may also be provided through a battery in the storage unit 100. The battery may be a rechargeable or a disposable battery.

The storage unit 100 may also comprise securing means for securing the hearing aids. The securing means are for securing that the hearing aid doesn't break during transport. These securing means comprise shaping of the storage space 102 in shape of the hearing aid, ribbons, which are provided with Velcro for tying together, a lid 109 that doesn't provide any free space between the hearing aid and the lid 109, a clip under which the whole or part of the hearing aid can be squeezed under, or a sliding part that can slide over the hearing aid thus securing the hearing aid to the storage unit 100.

The storage unit further comprises a storage space for storing the remote control 400. By having a dedicated space for the remote control 400, it is always easy to find it.

The storage space for the remote control is preferably shaped in the form of the remote control. The storage space for the remote control is provided with one or more indentations 110 along the side, in order to allow one to get hold on the remote control 400 with one's fingers.

The storage space for storing the remote control 400 comprise remote control securing means in order to secure that the remote control 400 doesn't fall out, if the storage unit is moved. It furthermore secures that only the caretaker, and not a mentally challenged user, removes the remote control and maybe displaces it. The securing means comprise a resilient material, or spring like material in the form of clips positioned e.g. at the top or bottom of the area where the remote control 400 is meant to be placed in the storage unit 100.

The storage unit 100 further comprises a bar code or a 2D code 103 with a link to the internet. Through the link the user can find information about the hearing aid, user instructions etc. The barcode or a 2D code 103 may be readable by means of a cell phone or other mobile communication terminal. By taking a picture of the barcode, a link to the user manual may open in a browser in e.g. a mobile communication terminal. In this way up to date information is always accessible.

The storage unit 100 further comprises a storage space 108 for storing a USB cable, a storage space 106 for storing a power supply and a storage space 107 for storing a cleaning kit. In this way the user or caretaker will have no problem finding the accessories to the storage unit 100 and hearing aid, as they are all in the same place.

A storage system may also comprise separate user input means, here shown in the form of a remote control. Here the user provides instructions to turn up or down the volume, to mute the hearing aid or to turn off the storage unit etc. This is easier to handle and control from a remote unit than from the hearing aid itself, as it may be difficult to handle buttons or input means situated directly on the hearing aid, due to their size and position at the ear. The user input means may also be placed completely or partly in the remote control 400 as well as in the storage unit 100. The remote control may be operated both when it is placed in the storage unit 100 and when it is placed outside the storage unit.

FIG. 2 shows an embodiment of a hearing aid 200. The hearing aid 200 is of a kind that is able to communicate with the storage system. The hearing aid 200 comprises a housing 202, an ear plug part 201 and a connector 203 for connecting the housing 202 with the ear plug part 201. By housing 202 is meant the housing including the circuitry inside. In this embodiment the hearing aid is a RITE, as it is relatively small and a cosmetically attractive hearing aid and it is robust and easy to handle. Other types of hearing aids may be used as well. The hearing aid may be a Behind The Ear (BTE), In the Canal (ITC) or a Completely In the Canal (CIC) hearing aid. If the hearing aid is an ITC or a CIC hearing aid, the housing will be a part of the ear plug part as well, and there will be no separate housing.

The hearing aid comprises a battery or power pack. The battery may be charged wirelessly via an inductive charger in the storage system, or the power pack may be recharged by removing the power pack from the hearing aid by pulling or twisting the power pack. This power pack may then be inserted in a charger and placed in the hearing aid after charging.

The hearing aid comprises a telecoil, a charging coil, a radio module, two or more microphones and a telephone, i.e. a miniature speaker (not shown). These features and others will be explained in more detail in association with FIG. 6.

FIG. 3 shows an embodiment of a power supply 300 that can provide power to the storage system. This embodiment has a USB plug 301 for connecting the power supply 300 to a USB socket on the storage system. A cable 303 connects the USB plug 301 with a transformer 302. The power supply 300 is insertable into a regular household power outlet. The power may also be provided from a battery.

FIG. 4 shows an embodiment of a remote control 400. The remote control 400 facilitates the communication between the user and the hearing aid and works as an information providing part. The information providing part is mainly for the caretaker to use, and it can be hidden, so the remote control 400 only looks like a normal remote control 400. The remote control 400 is easy to handle, compared to buttons that are positioned directly on the hearing aid. The remote control comprises a volume up button 402 and a volume down button 401, pictograms such as a status indicator 403, which may indicate the status of automatic connections such as TV/telecoil, right hearing aid 404 and left hearing aid 405, and a battery indicator 406 that indicates the amount of battery power remaining on the hearing aids. The pictograms may be backlit and may be activated by pressing the status button or the pictogram itself. The buttons may also be embodied in a touch screen on the storage unit or the remote control. The remote control 400 may display functioning and guiding information on an information providing part. The remote control may also comprise processing means and output means, so the hearing aid(s) can communicate exclusively with the remote control, thereby eliminating the need for the whole system to be available at all times, e.g. when the user is going out.

Other embodiments could also be considered, e.g. an acoustic remote control that produces a simple "click" sound. The click sound is then received by the microphones in the hearing aid and only requires a simple algorithm to be transformed into an action, e.g. toggling between muting and not muting the hearing aids. More advanced series of clicks, like a "double click" could also be implemented.

A click sound or acoustic signature could also be implemented in the lid of the storage unit. So when the lid is closed a click sound is produced and the hearing aids are e.g. muted or switched off, and, vice versa, when the lid is opened, a click sound is produced, and the volume of the hearing aids is turned up or the hearing aid is turned on.

Figure 5:
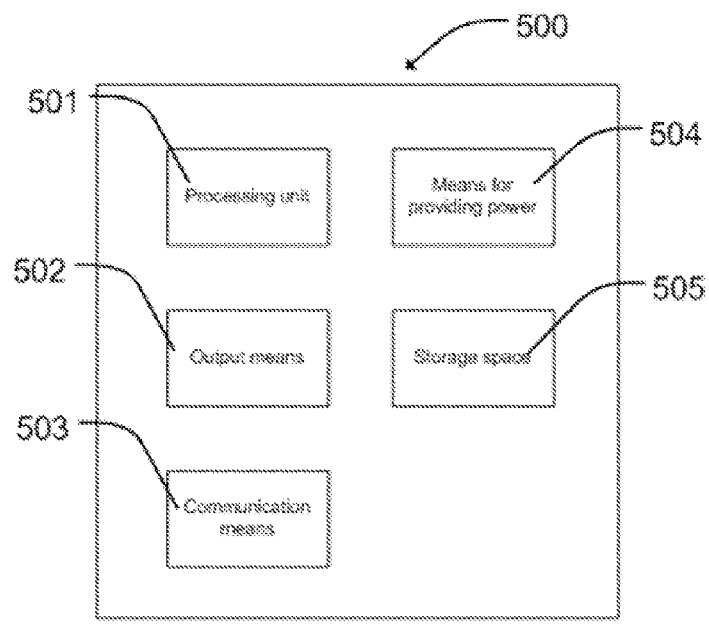
FIG. 5 illustrates a diagram of an embodiment of a storage system.

The embodiments shown in FIGS. 2-4 may constitute a kit of parts communicating together via communication means described under FIG. 5.

FIG. 5 shows a diagram of an embodiment of a storage system 500. The storage system 500 is made to work together with one or more hearing aids, such as the hearing aid in FIG. 2 and in FIG. 6.

The storage system 500 comprises a processing unit 501 that processes data input from the hearing aid and from a user. For example the input can come from the testing and detecting means in the hearing aid or input from the remote control.

The storage system 500 further comprises output means 502 such as a display, a screen, loudspeakers or one or more light emitting diodes. The output means may show the results of the testing and detecting in a user friendly manner, e.g. simple and short sentences that do not require any analysis.

Communication means 503 provides communication between the hearing aid and the storage system 500 or the remote control. The communication means 503 may be selected from a group consisting of Blue Tooth, infrared signals, radio signals, Wireless USB, Near Field Communication (NFC), ZigBee, Ultra wideband (UWB), induction via the charger or other communication technologies.

The storage system 500 may also comprise a memory. The memory may be used for storing information received from the hearing aid.

The storage system 500 also comprises means for providing power 504, such as a USB, a mini USB, a battery, a storage space 505 and a charging space for the hearing aid's where the hearing aid's may be charged wirelessly via electromagnetic induction, radio frequency waves or electromagnetic resonance.

Figure 6:
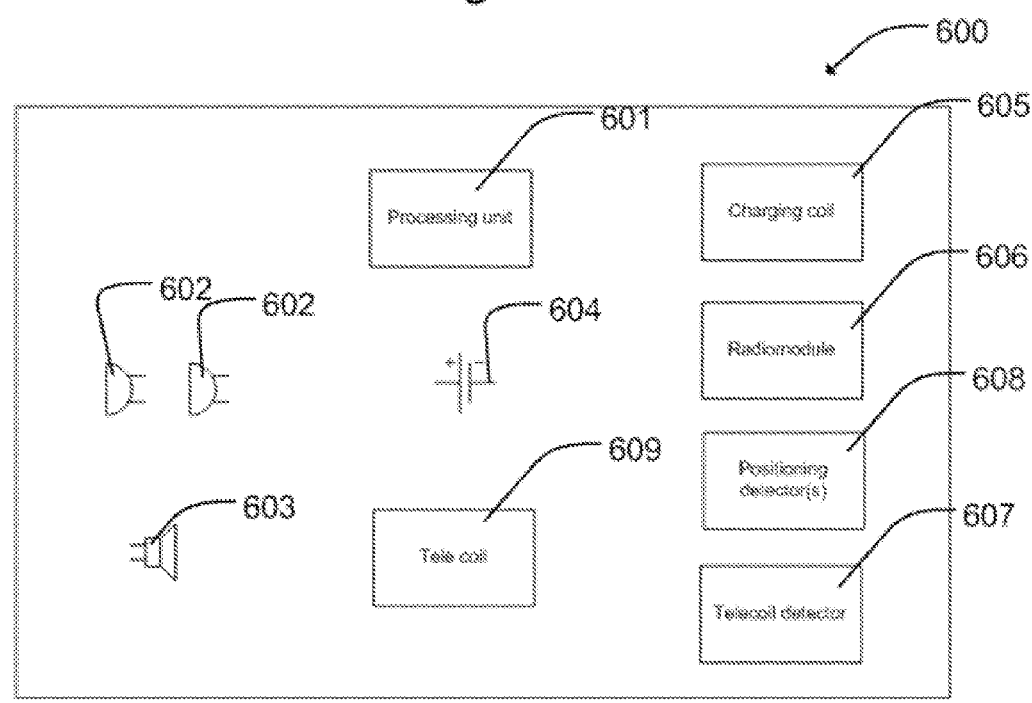
FIG. 6 illustrates a diagram of an embodiment of a hearing aid.

FIG. 6 shows a diagram of an embodiment of a hearing aid 600 that can be used in connection with the storage system. The hearing aid 600 can communicate with the storage system and provide data regarding the positioning of the ear plug part in a user's ear.

The hearing aid 600 comprises detecting means, which detect if the earplug part is positioned correctly. These detecting means comprise different positioning detectors 608, which have different means for detecting the position of the ear plug part. Examples of the means and the methods are described in the following:

Electro acoustic methods based on measurement of the acoustic impedance from the telephone to two external microphones, or measurement of the acoustic impedance from the telephone to an internal microphone, and comparison of this acoustic impedance with a pre-stored impedance measured when the ear plug part is correctly positioned.

Capacitative methods where the capacitance between conducting areas, placed separately on the ear plug part, is measured. This is based on the fact that the relative permeability for skin is much larger than for air, thus the capacitance will be much greater if the ear plug part is in contact with the ear. Another method is to use an electrically biased material. In this case instead of measuring the capacitance, the voltage on a capacitor is measured.

Electro mechanical methods based on the fact that when skin or tissue touches the ear plug part, a deformation or a pressure on the ear plug part may be registered. This may be registered by strain gauges or by a contact that is being connected when the pressure is registered.

Optical methods comprising active and passive methods.

The active methods comprise placing one or more light emitters and receivers on the ear plug part, and measuring the amount of light reflected by means of one or more light sensors. If the ear plug part is in contact with the skin, a higher reflection will be obtained. The emitted light may also be modulated and the detected light demodulated in order to differentiate the test light from the surrounding light.

The passive method comprises measuring if there is ambient light, by means of one or more light sensors placed on the ear plug part. If light is detected, the ear plug part is not positioned correctly. If there is no light detected, the ear plug part is positioned correctly.

An incorrect positioning of the hearing aid at the ear may result in a voice message through the hearing aid to the user that the hearing aid requires repositioning.

Parts of the detecting means may also be implemented in the storage system.

The hearing aid also comprises a processing unit 601. The processing unit 601 processes data collected from the one or more positioning detectors 608. In this way the data can be processed in the hearing aid 600 instead of in the storage system. The data may also be transmitted to the storage system where the results are analyzed in a processing unit and displayed as positioning information on the storage unit, e.g. in the lid.

The processing unit 601 is furthermore used for controlling the different programs, between which the hearing aid can automatically switch. This includes reception of a telecoil signal. The processing unit 601 is furthermore used for controlling sound processing, noise reduction etc.

The hearing aid further comprises a radio module 606, which allows for TV streaming.

The hearing aid 600 further comprises two microphones 602 which allow for the use of a directional system, which reduces noise and increases speech understanding in noisy surroundings.

The hearing aid 600 further comprises a battery 604 and a charging coil 605. The battery is preferably a rechargeable battery, a zinc-silver battery or a lithium-polymer battery. The important thing is that the battery can handle a nightly recharge over a longer period of time, e.g. 1½-2 years. Depending on the type of battery a power management circuit may be required in order to control and monitor the charging and discharging of the battery, if it is a rechargeable battery.

The hearing aid further comprises a telephone, i.e. a miniature loudspeaker 603 to transmit the sound. The hearing aid 600 may comprise a wax filter indicator which indicates if the wax filter requires changing. This may be done by changing the color of the wax filter.

Figure 7:
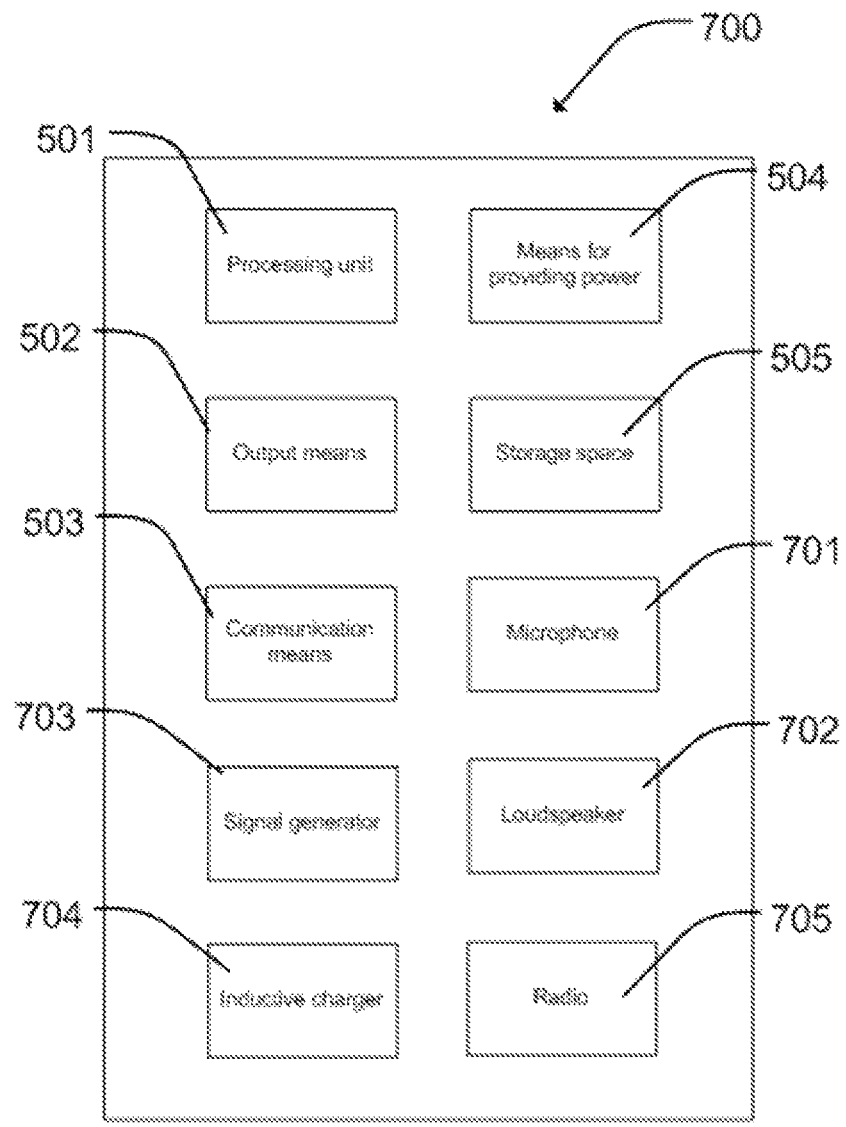
FIG. 7 illustrates a diagram of an embodiment of a storage unit.

FIG. 7 shows a diagram of an embodiment of a storage unit 700. This embodiment is able to test the functionality of the hearing aid. The test may be initiated either by the user, e.g. by pressing a button or producing a sound, or the test may be initiated automatically by use of detectors. Functional testing of hearings aids as such is known in the art, inter alia from US2007/0286429, which describes an apparatus for testing the functioning of a hearing device.

The testing means according to the present invention comprises the microphone 701, the loudspeaker 702, the signal generator 703 and a radio 705. The testing means can test the microphone(s), the telephone and the radio module of the hearing aid. The microphone 701 is used to test the telephone of the hearing aid. The signal generator 703 is used to generate test signals, which are transmitted over the loudspeaker 702 in order to test the microphone(s) of the hearing aid. The communication between the hearing aid and the storage unit 700 takes place via the inductive charger 704. The way the different tests work will now be explained in more detail below.

The microphone(s) in the hearing aid is tested by placing the hearing aid in a known acoustic environment, such as the storage unit 700, and by playing a known input signal aloud. The response of the hearing aid will also be known. If the response doesn't correspond to what would be expected, then the hearing aid malfunctions. E.g. by having the signal generator 703 send a test signal, such as a chirp over frequency, it is possible to see if one of two microphones, or both microphones, fail, and which one it is.

The radio module of the hearing aid may also be tested by placing the hearing aid in the storage unit 700. The distance between the radio module in the hearing aid and a radio 705 in the storage unit 700, as well as the acoustic environment in the storage unit 700, will be known. The transmission power is then reduced to a minimum and the signal generator 702 generates a signal. If no signal is received by the radio module in the hearing aid, then the radio module in the hearing aid is out of order. Furthermore the telephone may also be tested.

The loudspeaker is tested by detecting higher harmonics, such as $3^{rd}$ harmonics, occurring if a defective loudspeaker distorts an applied pure tone.

The processing unit 501 is used to process the data from the microphone 701, the loudspeaker 702, the signal generator 703 and a radio 705, and evaluate the data. This can be done by having reference values comparable with result values from the test. When the reference values have been compared with the result values, feedback is provided. The feedback may be in the form of data or instructions being sent to the hearing aid, or it may be in the form of a voice message being sent to the user from either the hearing aid or from the storage unit, or a combination of these. The test may be performed with the hearing aid in the storage unit or with the ear plug part in the ear. The test may also be handled exclusively from the hearing aid or in connection with the remote control that may function as a processing unit. The tests can be performed by the user or caretaker and the results of the tests are then presented in a user friendly manner on the output means 502.

The invention has mainly been described above with reference to a few embodiments. However, as is readily appreciated by a person skilled in the art, other embodiments than the ones disclosed above are equally possible within the scope of the invention, as defined by the appended patent claims.

We claim:

1. A storage system for storing a hearing aid, the system comprising
    a supply of power,
    a storage space for containing a hearing aid,
    an output element,
    communication component adapted for wireless reception of data from the hearing aid,
    a processing unit for processing data received from the hearing aid,
    wherein the output provides information to a user of the hearing aid concerning the functioning of the hearing aid and for guiding the user through positioning of the hearing aid in the ear.

2. The system according to claim 1, comprising a remote control.

3. The system according to claim 2, wherein the output element is responsive to said processing unit in said storage system and is provided on the remote control.

4. The system according to claim 2, wherein said storage space is provided in a storage unit, said system further comprising a remote control securing structure for keeping the remote control attached to the storage unit.

5. The system according to claim 1, comprising a user input component configured for receiving user input to the storage system.

6. The system according to claim 5, wherein the user input component is selected from a group consisting of a remote control, a touch screen and keys.

7. The system according to claim 1, wherein the functioning and guiding information is presented in a form selected from a group consisting of written statements and figures, pictograms, LED's, sound and a bar code.

8. The system according to claim 1, wherein the output element is responsive to said processing unit in said storage system and is selected from a group consisting of a display, a light emitting diode and a loud speaker.

9. The system according to claim 1, comprising a charger adapted for charging a rechargeable battery of the hearing aid.

10. The system according to claim 9, wherein the charger is adapted to charge the rechargeable battery of the hearing aid wirelessly.

11. The system according to claim 1, comprising a detector adapted to detect if the hearing aid is in the storage space.

12. The system according to claim 1, further comprising a tester for testing functionality of the hearing aid.

13. The system according to claim 1, comprising a storage unit provided with a lid.

14. The system according to claim 13, wherein the lid comprises the output element.

15. A kit comprising
   a hearing aid,
   a remote control,
   a storage unit, and
   an output element, wherein the hearing aid is adapted to communicate wirelessly with a communication component of the storage unit, and wherein the output element is responsive to said storage unit and is adapted for providing information concerning the functioning of the hearing aid and for guiding the user through positioning of the hearing aid in the ear.

16. A method of using a storage system, the method comprising
   initiating a detection by a hearing aid of a position of an earplug part of the hearing aid in an ear,
   receiving in a processing unit of said storage system result values from the detection from said hearing aid,
   comparing result values with reference values, and
   providing feedback information for guiding the user regarding the position.

\* \* \* \* \*